United States Patent
Chiu et al.

(10) Patent No.: US 10,310,276 B2
(45) Date of Patent: Jun. 4, 2019

(54) VIRTUAL REALITY DISPLAY APPARATUS

(71) Applicant: Acer Incorporated, New Taipei (TW)

(72) Inventors: Yi-Jung Chiu, New Taipei (TW); Wei-Kuo Shih, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 15/823,620

(22) Filed: Nov. 28, 2017

(65) Prior Publication Data
US 2018/0321498 A1    Nov. 8, 2018

(30) Foreign Application Priority Data
May 4, 2017   (TW) .............. 106114785 A

(51) Int. Cl.
*G02B 27/09*     (2006.01)
*G02B 27/01*     (2006.01)
*G02B 3/08*      (2006.01)

(52) U.S. Cl.
CPC ........... *G02B 27/0966* (2013.01); *G02B 3/08* (2013.01); *G02B 27/0172* (2013.01)

(58) Field of Classification Search
CPC .............. G02B 27/017; G02B 27/0093; G02B 2027/0134; G02B 27/0025; G02B 27/42; G02B 27/0172; G02B 27/0178; G02B 27/0966; G02B 27/2228; G02B 2027/0136; G02B 2027/0178; G02B 2027/0187
See application file for complete search history.

(56) References Cited

U.S. PATENT DOCUMENTS

| | | | | |
|---|---|---|---|---|
| 4,210,391 A | * | 7/1980 | Cohen ................. | G02B 5/1876 351/159.39 |
| 6,310,733 B1 | * | 10/2001 | Dolgoff .............. | G02B 27/2278 359/743 |
| 9,239,453 B2 | * | 1/2016 | Cheng .................... | G03B 21/00 |
| 9,810,904 B1 | * | 11/2017 | Bierhuizen .......... | H04N 13/344 |
| 2017/0219828 A1 | * | 8/2017 | Tsai ................... | G02B 27/0172 |
| 2017/0233582 A1 | * | 8/2017 | Zhao ...................... | C09D 5/006 353/77 |
| 2018/0045960 A1 | * | 2/2018 | Palacios ............... | G02B 27/017 |

FOREIGN PATENT DOCUMENTS

| | | |
|---|---|---|
| CN | 106125168 | 11/2016 |
| TW | I553344 | 10/2016 |
| WO | 2016025443 | 2/2016 |
| WO | 2017108211 | 6/2017 |

* cited by examiner

*Primary Examiner* — Sultan Chowdhury
(74) *Attorney, Agent, or Firm* — JCIPRNET

(57) ABSTRACT

A virtual reality display apparatus includes at least one display and at least one optical assembly. The display is configured to provide an image beam to a user's left eye or right eye. The optical assembly is disposed on a transmission path of the image beam. The optical assembly includes a first Fresnel lens which includes a plurality of ring structures surrounding an optical axis thereof. Each of the ring structures has an effective refraction surface and an optically non-effective surface connected to the effective refraction surface and disposed between the optical axis and the effective refraction surface. An average inclined angle of optically non-effective surfaces in a central area of the first Fresnel lens inclined with respect to the optical axis is smaller than an average inclined angle of optically non-effective surfaces in a peripheral area of the first Fresnel lens inclined with respect to the optical axis.

11 Claims, 3 Drawing Sheets

US 10,310,276 B2

VIRTUAL REALITY DISPLAY APPARATUS

CROSS-REFERENCE TO RELATED APPLICATION

This application claims the priority benefit of Taiwan application serial no. 106114785, filed on May 4, 2017. The entirety of the above-mentioned patent application is hereby incorporated by reference herein and made a part of this specification.

BACKGROUND OF THE INVENTION

Field of the Invention

The invention is related to a display apparatus, and particularly to a virtual reality display apparatus.

Description of Related Art

Along with development of display technologies, to feel more real, users are no longer satisfied with watching 2D images. In order to provide users with visual entertainment with more sense of reality in three-dimensional (3D) images, virtual reality (VR) becomes a new trend of current display technologies. VR can be applied to simulate a virtual scene of a 3D space to provide users with special visual experiences, to watch images in a 3D space or 2D space, or even interact with a virtual image.

A common VR display apparatus is, for example, a head mounted display (HMD), which can be wore on the user's head. At this time, a display in the VR display apparatus is very close to the user's eyes. In order to allow the user's eyes to see the images displayed on the display clearly within a short distance, that is, to enable the images shown on the display to be imaged on the retina of user's eyes, an optical element (e.g. lens) is disposed between the display and the user's eyes, and a traveling path of light is changed via refractive power thereof so that the images can be imaged on the retina of the user's eyes. Accordingly, the user can see the virtual image in front of the eyes and feel more real.

However, some surfaces of the optical element are likely to make a portion of the light from the display not to travel in a direction and path that are initially expected, but is reflected toward a direction that is not expected and result in stray light. The stray light affects the quality of the image seen by the user and deteriorate the user's visual experiences.

SUMMARY OF THE INVENTION

The invention provides a virtual reality (VR) display apparatus, which can effectively reduce stray light.

An embodiment of the invention provides a VR display apparatus, including at least one display and at least one optical assembly. The display is configured to provide an image beam to a user's left eye or right eye. The optical assembly is disposed on a transmission path of the image beam, and between the display and the user's left eye or right eye. The optical assembly comprises a first Fresnel lens. The first Fresnel lens includes a plurality of ring structures surrounding an optical axis thereof. Each of the ring structures has an effective refraction surface and an optically non-effective surface connected to the effective refraction surface and disposed between the optical axis and the effective refraction surface. An average inclined angle of optically non-effective surfaces in a central area of the first Fresnel lens inclined with respect to the optical axis is smaller than an average inclined angle of optically non-effective surfaces in a peripheral area of the first Fresnel lens inclined with respect to the optical axis.

For the VR display apparatus in the embodiment of the invention, since the average inclined angle of the optically non-effective surfaces in the central area of the first Fresnel lens inclined with respect to the optical axis is smaller than the average inclined angle of optically non-effective surfaces in the peripheral area of the first Fresnel lens inclined with respect to the optical axis, an image beam incident on the effective refraction surface of the ring structure is less likely to be reflected by the non-effective surface subsequently and result in stray light. Accordingly, the VR display apparatus in the embodiment of the invention can effectively reduce generation of stray light, thereby improving the quality of the image seen by the user.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
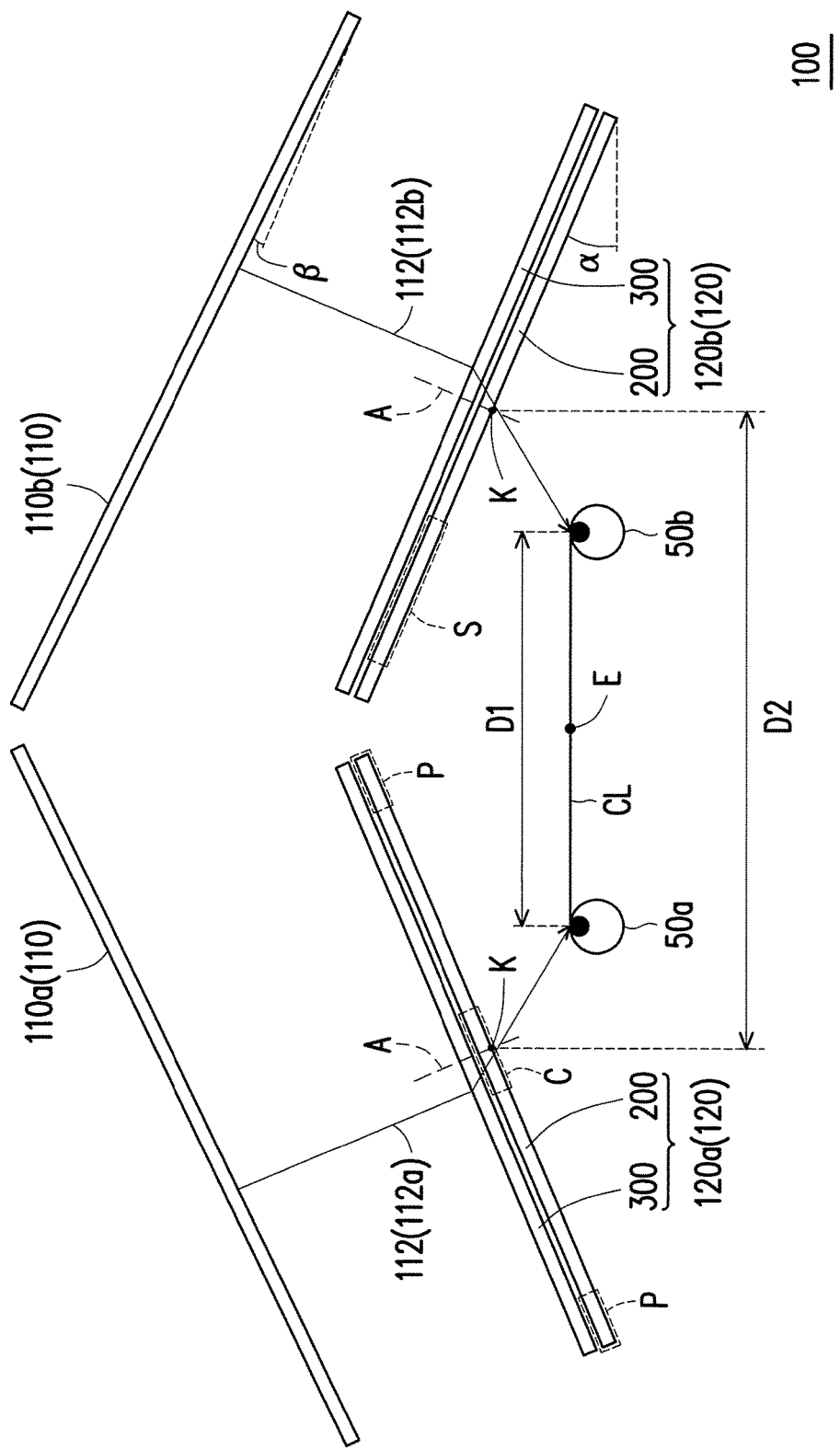
FIG. 1 is a sectional view of a virtual reality (VR) display apparatus according to an embodiment of the invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a sectional view of a virtual reality (VR) display apparatus according to one embodiment of the invention. Referring to FIG. 1, a VR display apparatus 100 in the embodiment includes at least one display 110 (FIG. 1 illustrates two displays 110a and 110b as examples) and at least one optical assembly 120 (FIG. 1 illustrates two optical assemblies 120a and 120b as examples). The display 110 is configured to provide an image beam 112 to a user's left eye 50a or right eye 50b. The optical assembly 120 is disposed on a transmission path of the image beam 112, and between the display 110 and the user's left eye 50a or right eye 50b. In the embodiment, the display 110a and display 110b respectively provide two image beams 112a and 112b, and the image beam 112a and the image beam 112b are respectively transmitted to the user's left eye 50a and right eye 50b via the optical assembly 120a and optical assembly 120b so as to form an image on the retina of the left eye 50a and right eye 50b. In the embodiment, the display 110 is, for example, a liquid crystal display panel, an organic light emitting diode display panel, a light emitting diode display panel or other suitable displays.

Figure 2:
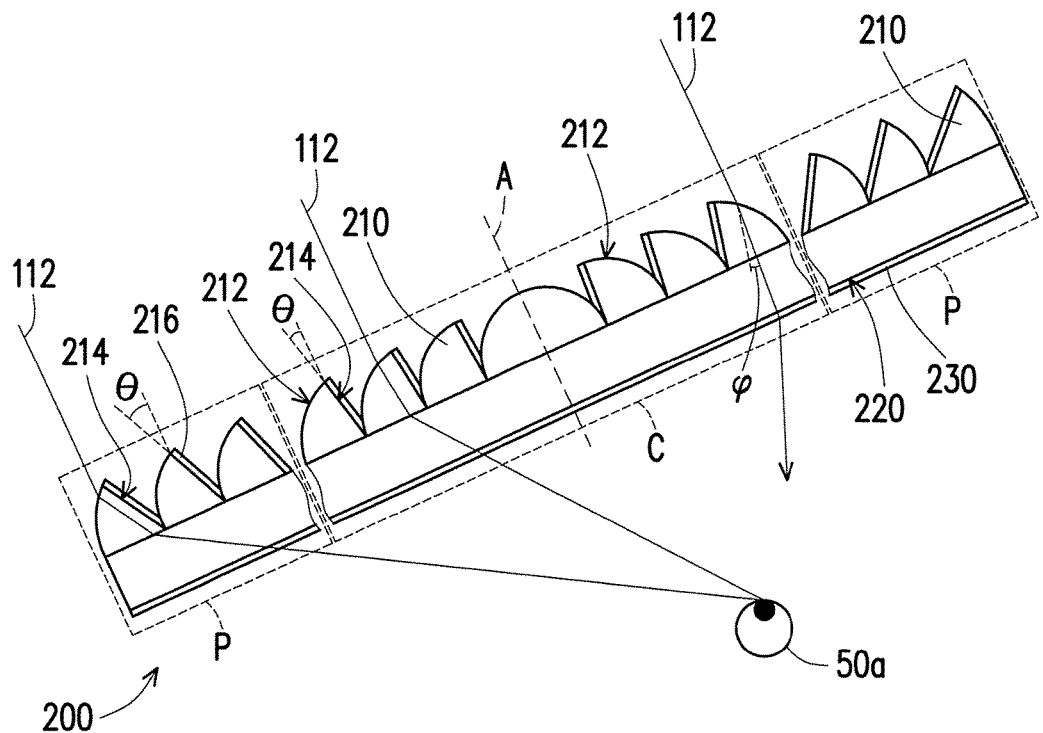
FIG. 2 is a sectional view of a portion of a first Fresnel lens in FIG. 1.
Figure 3:
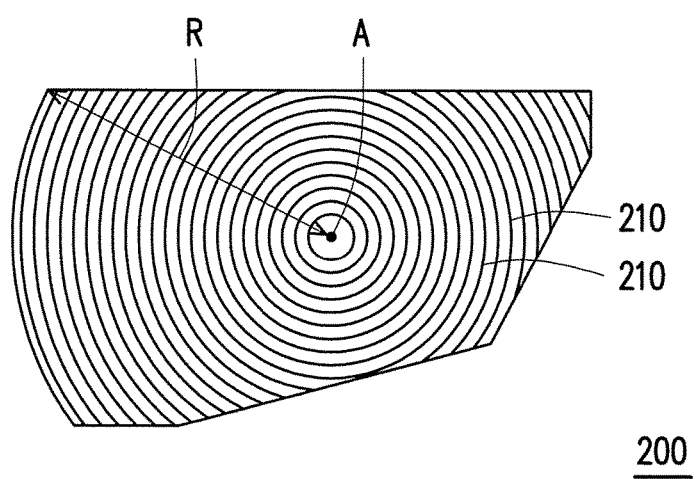
FIG. 3 is a front view of the first Fresnel lens in FIG. 1.

FIG. 2 is a sectional view of a portion of a first Fresnel lens in FIG. 1. In FIG. 2, there is actually a section of Fresnel lens structure between the two S of the double S-shaped symbol adjacent to each other. However, in order to show ring structures, FIG. 2 only illustrates the Fresnel lens structure located in a central area and a peripheral area for illustrative purpose. FIG. 3 is a front view of the first Fresnel lens in FIG. 1. Referring to FIGS. 1, 2 and 3, in the embodiment, the optical assembly 120 includes a first Fresnel lens 200 disposed on the transmission path of the image beam 112. The first Fresnel lens 200 includes a plurality of ring structures 210 surrounding an optical axis A thereof. Each of the ring structures 210 has an effective refraction surface 212 and an optically non-effective surface 214 connected to the effective refraction surface 212 and disposed between the optical axis A and the effective refraction surface 212. In the embodiment, the effective refraction surface 212 refers to a surface of the Fresnel lens for effectively refracting light so as to generate the effect of condensing or diverging light. In the embodiment, the first Fresnel lens 200 is equivalent to a convex lens, and the effective refraction surface 212 has an effect of condensing light. In addition, the optically non-effective surface 214 is a surface configured for connecting two adjacent effective refraction surfaces 212, which does not contribute to the effect of condensing or diverging light expected from the Fresnel lens.

An average inclined angle of optically non-effective surfaces 214 in a central area C of the first Fresnel lens 200 inclined with respect to the optical axis A is smaller than an average inclined angle of optically non-effective surfaces 214 in a peripheral area P of the first Fresnel lens 200 inclined with respect to the optical axis A. Specifically, each of the optically non-effective surfaces 214 has an inclined angle θ with respect to the optical axis A. The average value of the inclined angles θ in the central area C is smaller than the average value of the inclined angles θ in the peripheral area P. That is to say, on average, the optically non-effective surface 214 in the central area C is steeper than the optically non-effective surface 214 in the peripheral area P. Moreover, a traveling direction of the image beam 112 in the central area C incident from the effective refraction surface 212 has a smaller inclined angle with respect to the optical axis A; a traveling direction of the image beam 112 in the peripheral area P incident from the effective refraction surface 212 has a larger inclined angle with respect to the optical axis A. Therefore, with the configuration that the optically non-effective surface 214 in the central area C is steeper than the optically non-effective surface 214 in the peripheral area on average, the image beam 112 which is refracted by the effective refraction surface 212 is less likely to travel to the optically non-effective surface 214 and reflected into stray light by the optically non-effective surface 214. Accordingly, the VR display apparatus 100 in the embodiment can effectively reduce generation of stray light, thereby improving the quality of image seen by the user. In one embodiment, the inclined angle θ can be regarded as a releasing angle of molding of the optically non-effective surface 214.

In the embodiment, an area from a place at 0.1 times a radius R to a place at 0.5 times the radius R counted from the optical axis A, which is at a side of the first Fresnel lens 200 close to the place between the user's eyebrows E with respect to the optical axis A, is a specific area S, wherein the radius R is perpendicular to the optical axis A. Within the specific area S, after the image beam 112 is refracted by the effective refraction surface 212 of each of the ring structures 210, the inclined angle φ (as shown in FIG. 2) of the traveling direction of the image beam 112 with respect to the optically non-effective surface 214 of the ring structure 210 becomes smaller than or equal to 15°. The radius R is defined as a distance (as shown in FIG. 3) from the optical axis A to a place of the first Fresnel lens 200 that is farthest away from the optical axis A (e.g. a corner farthest away from the optical axis A), and the radius R is perpendicular to the optical axis A. In other words, the inclined direction of the optically non-effective surface 214 matches a traveling direction of the image beam 112 refracted by the effective refraction surface 212 of the same ring structure 212. In addition, in the embodiment, the central area C is, for example, an area from a place at 0 times the radius R to 0.5 times the radius R counted the optical axis A, wherein the radius R is perpendicular to the optical axis A. The peripheral area P is, for example, an area from a place at 0.5 times the radius R to 1 times the radius R counted from the optical axis A, wherein the radius R is perpendicular to the optical axis A.

In the embodiment, inclined angles θ of the optically non-effective surface 214 arranged at a plurality of different positions along a circumference direction of each of the ring structures 210 with respect to the optical axis A are different from one another, so that the inclined direction of the optically non-effective surface 214 matches the traveling direction of the image beam 112 refracted by the effective refraction surface 212 of the ring structure 210. For example, in FIG. 2, the inclined angle θ of the left end (the end away from the place between eyebrows E) of the first Fresnel lens 200 is smaller than the inclined angle θ of the right end (the end close to the place between eyebrows E) of the first Fresnel lens 200. In other words, the optically non-effective surface 214 of each of the ring structures 210 is not axially symmetric. For example, the optical axis A is not set as a symmetric axis to make the optically non-effective surface 214 form axial symmetry. In the embodiment, a distance D1 between the pupils of user's left eye 50a and right eye 50b is smaller than a distance D2 between optical centers K of the two first Fresnel lens 200 of the two optical assemblies 120a and 120b. That is to say, the left eye 50a and right eye 50b are designed to be eccentric with respect to the first Fresnel lens 200. Therefore, the optically non-effective surface 214 of each of the ring structures 210 correspondingly adopts the non-axially symmetric design. In one embodiment, the inclined angle θ of the optically non-effective surface 214 of each of the ring structures 210 with respect to the optical axis A is smaller than or equal to 45°, and is, for example, larger than 0°.

The above-mentioned features regarding the inclined angles θ or the degree of inclination of the optically non-effective surfaces 214 are dedicated to reduce the chance that the image beam 112 refracted by the effective refraction surface 212 is reflected into the stray light by the optically non-effective surface 214. However, another factor that causes generation of stray light is that the image beam 112 is likely to be incident to the first Fresnel lens 200 from the optically non-effective surface 214 and is refracted or reflected into stray light by the optically non-effective surface 214. In order to solve the problem of stray light generated in such manner, in the embodiment, the optically non-effective surfaces 214 of the ring structures 210 are covered by a plurality of light-absorbing material layers 216, respectively. Through this configuration, the image beam 112 which is incident to the light-absorbing material layer 216 is absorbed so that the stray light is not generated. The material of the light-absorbing material layer 216 is, for example, black ink, a resin mixed with black toner or other suitable materials. However, the invention provides no limitation to the type of materials of the light-absorbing material layer 216 or the coating method, which may be selected as appropriate by people of ordinary skill in the art depending on actual circumstances.

Figure 4:
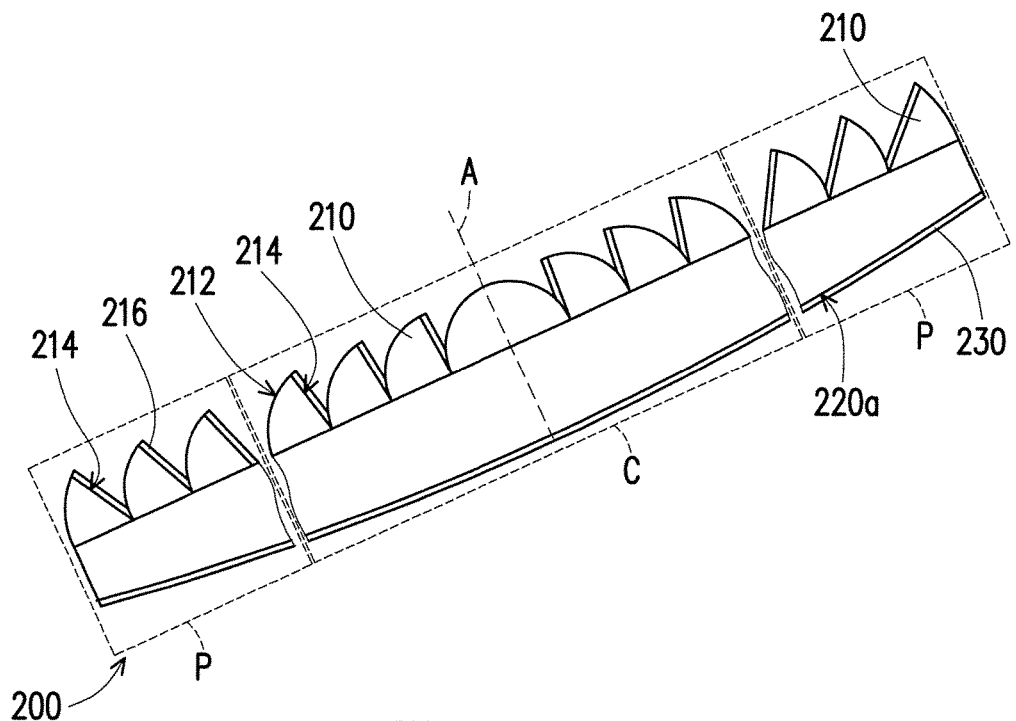
FIG. 4 and FIG. 5 are partial sectional views of two variations of the first Fresnel lens in FIG. 2.
Figure 5:
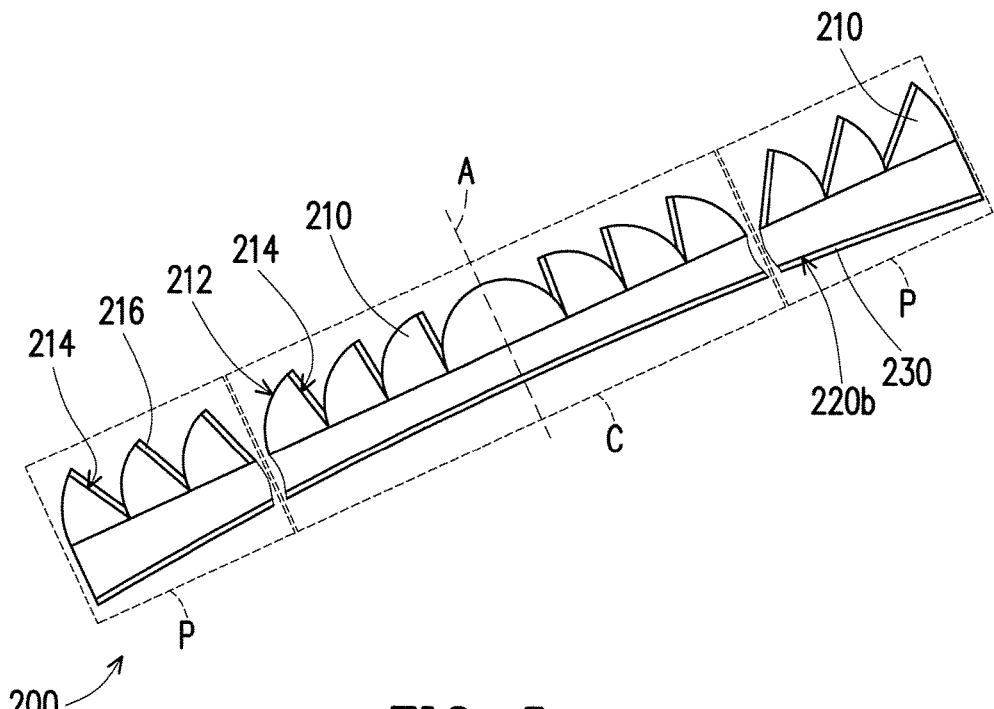

In the embodiment, the first Fresnel lens 200 has a smooth surface 220 facing away from the ring structures 210, and the smooth surface 220 is provided with an anti-reflection layer 230 thereon. The anti-reflection layer 230 can reduce the reflectivity of the smooth surface 220 in reflecting the image beam 112 so as to reduce the chance of reflecting the image beam 112 by the smooth surface 20, thereby decreasing the occurrence of stray light. The anti-reflection layer 230 is, for example, a multiple-layered anti-reflection film or single-layered anti-reflection film. In addition, in other embodiments, the smooth surface 220 is, for example, a plane surface, and the ring structures 210 are disposed between the display 110 and smooth surface 220. For example, the first Fresnel lens 200 may include a substrate 240. A side of the substrate is the smooth surface 220, and another side of the substrate is provided with the ring structure 210. The substrate 240 and the ring structure 210 may be formed of transparent materials. In addition, in other embodiments, a smooth surface 220a may be a curved convex surface (as illustrated in FIG. 4), or a smooth surface 220b may be a curved concave surface (as shown in FIG. 5). Moreover, the optical center K is, for example, an intersection point between the optical axis A and the smooth surface 220.

Based on the above, the first Fresnel lens 200 in the embodiment adopts three kinds of designs as mentioned above for reducing stray light. The first design is the design of inclined angles θ of the optically non-effective surfaces 214. The second design is the design of the light-absorbing material layer 216. The third design is the design of the anti-reflection layer 230. The three designs are used to reduce stray light, thereby effectively reducing the situations where images get foggy, images have streaks and images have obvious concentric interface mark. However, in other embodiments, the first Fresnel lens 200 can also achieve the effect of reducing a portion of stray light by adopting any one or two designs of the three designs.

In the embodiment, each optical assembly 120 further includes a second Fresnel lens 300 disposed on the transmission path of the image beam 112 and located between the display 110 and the first Fresnel lens 200. Alternatively, in another embodiment, the second Fresnel lens 300 may be disposed between the first Fresnel lens 200 and the user's left eye 50a or right eye 50b, that is, the first Fresnel lens 200 is located between the display 110 and the second Fresnel lens 300; that is to say, in FIG. 1, the position of the first Fresnel lens 200 is switched with the position of the second Fresnel lens 300. Like the first Fresnel lens 200, or like the first Fresnel lens in FIG. 4 or FIG. 5, the second Fresnel lens 300 may also adopt the three designs for reducing stray light, or adopt any one or two designs of the three designs. Or, the second Fresnel lens 300 may be a general Fresnel lens, which does not adopt any one of the three designs. In the embodiment, both of the smooth surface 220 of the first Fresnel lens 200 and the smooth surface of the second Fresnel lens 300 face away from the display 110. However, in other embodiments, both of them may face the display 100. Alternatively, one of them faces the display 110 while the other one faces away from the display 110.

In the embodiment, the optical assembly 120 is inclined at an inclined angle α with respect to a connecting line CL of the user's left eye 50a and right eye 50b. The inclined angle α is an acute angle which is, for example, larger than 0° and is smaller than or equal to 45°. Additionally, the display 110 is inclined at an inclined angle β with respect to the corresponding optical assembly 120. The inclined angle β is an acute angle which is, for example, larger than or equal to 0° and is smaller than 15°.

In summary of the above, for the VR display apparatus in the embodiment of the invention, since the average inclined angle of optically non-effective surfaces in the central area of the first Fresnel lens inclined with respect to the optical axis is smaller than the average inclined angle of optically non-effective surfaces in the peripheral area of the first Fresnel lens inclined with respect to the optical axis, the image beam incident from the effective refraction surface of the ring structure is less likely to be reflected by the optically non-effective surfaces afterward and cause stray light. Accordingly, the VR display apparatus in the embodiment of the invention can effectively reduce generation of stray light, thereby improving the quality of the image seen by the user.

It will be apparent to those skilled in the art that various modifications and variations can be made to the structure of the invention without departing from the scope or spirit of the invention. In view of the foregoing, it is intended that the invention covers modifications and variations of this invention provided they fall within the scope of the following claims and their equivalents.

What is claimed is:
1. A virtual reality (VR) display apparatus, comprising:
   at least one display, configured to provide an image beam to a user's left eye or right eye; and
   at least one optical assembly, disposed on a transmission path of the image beam, and between the display and the user's left eye or right eye, wherein the optical assembly comprises a first Fresnel lens, the first Fresnel lens comprises a plurality of ring structures surrounding an optical axis thereof, each of the ring structures has an effective refraction surface and an optically non-effective surface connected to the effective refraction surface and disposed between the optical axis and the effective refraction surface,
   wherein inclined angles of optically non-effective surfaces of the ring structures, with respect to the optical axis, increase in a direction from the optical axis toward a peripheral area of the first Fresnel lens, so that an average inclined angle of optically non-effective surfaces in a central area of the first Fresnel lens inclined with respect to the optical axis is smaller than an average inclined angle of optically non-effective surfaces in the peripheral area of the first Fresnel lens inclined with respect to the optical axis.

2. The VR display apparatus according to claim 1, wherein an area from a place at 0.1 times a radius to a place at 0.5 times the radius counted from the optical axis, which is at a side of the first Fresnel lens close to a place between the user's eyebrows with respect to the optical axis, is a specific area, wherein the radius is perpendicular to the optical axis, after the image beam is refracted by an effective refraction surface of each of ring structures within the specific region, an inclined angle of a traveling direction of the image beam with respect to an optically non-effective surface of the ring structure is smaller than or equal to 15°.

3. The VR display apparatus according to claim 1, wherein the inclined angles of the optically non-effective surface arranged at a plurality of different positions along a circumference direction of each of the ring structures with respect to the optical axis are different from one another, so that an inclined direction of the optically non-effective surface matches a traveling direction of the image beam refracted by the effective refraction surface of the ring structure.

4. The VR display apparatus according to claim 1, wherein the optically non-effective surface of each of the ring structures is not axially symmetric.

5. The VR display apparatus according to claim 1, wherein optically non-effective surfaces of the ring structures are covered by a plurality of light-absorbing material layers, respectively.

6. The VR display apparatus according to claim 1, wherein the first Fresnel lens has a smooth surface facing away from the ring structures, and the smooth surface is provided with an anti-reflection layer thereon.

7. The VR display apparatus according to claim 6, wherein the smooth surface is a plane surface, and the ring structures are disposed between the display and the smooth surface.

8. The VR display apparatus according to claim 6, wherein the smooth surface is a curved concave surface or a curved convex surface.

9. The VR display apparatus according to claim 1, wherein the optical assembly further comprises a second Fresnel lens disposed on the transmission path of the image path and located between the display and the first Fresnel lens, or located between the first Fresnel lens and the user's left eye or right eye.

10. The VR display apparatus according to claim 1, wherein the at least one display is two displays, the at least one optical assembly is two optical assemblies, the two displays respectively provide two image beams, the two image beams are respectively transmitted to the user's left eye and right eye via the two optical assemblies, a distance between pupils of the left eye and the right eye is smaller than a distance between optical centers of the two first Fresnel lens of the two optical assemblies.

11. The VR display apparatus according to claim 1, wherein the inclined angle of the optically non-effective surface of each of the ring structures with respect to the optical axis is smaller than or equal to 45°.

\* \* \* \* \*